(12) United States Patent
Carafini et al.

(10) Patent No.: US 11,725,322 B2
(45) Date of Patent: Aug. 15, 2023

(54) BETTER DOSING WITH A VIRTUAL AND ADAPTIVE LOW COST DOSER

(71) Applicant: WHIRLPOOL CORPORATION, Benton Harbor, MI (US)

(72) Inventors: Adriano Carafini, Rio Claro (BR); Omar Rachid Murad, Rio Claro (BR); Jean Ricardo Rusczak, Kalamazoo, MI (US); Mauro Roberto Ushizima, Rio Claro (BR); Caio Cesar Rodrigues Ferrari, Rio Claro (BR)

(73) Assignee: Whirlpool Corporation, Benton Harbor, MI (US)

( * ) Notice: Subject to any disclaimer, the term of this patent is extended or adjusted under 35 U.S.C. 154(b) by 113 days.

(21) Appl. No.: 17/495,622

(22) Filed: Oct. 6, 2021

(65) Prior Publication Data

US 2023/0109579 A1     Apr. 6, 2023

(51) Int. Cl.
| | |
|---|---|
| *D06F 33/37* | (2020.01) |
| *D06F 34/22* | (2020.01) |
| *D06F 39/02* | (2006.01) |
| *D06F 34/18* | (2020.01) |
| *G06V 20/00* | (2022.01) |
| *D06F 103/04* | (2020.01) |

(52) U.S. Cl.
CPC ............. *D06F 33/37* (2020.02); *D06F 34/18* (2020.02); *D06F 34/22* (2020.02); *D06F 39/02* (2013.01); *G06V 20/00* (2022.01); *D06F 2103/04* (2020.02)

(58) Field of Classification Search
CPC ..................................................... D06F 33/37
See application file for complete search history.

(56) References Cited

U.S. PATENT DOCUMENTS

| | | |
|---|---|---|
| 9,243,987 B2 | 1/2016 | Chanda et al. |
| 9,739,004 B2 | 8/2017 | Ha et al. |
| 9,850,613 B2 | 12/2017 | Kamon et al. |
| 2018/0080164 A1 | 3/2018 | Hoppe et al. |

FOREIGN PATENT DOCUMENTS

| | | |
|---|---|---|
| CN | 105603678 A | 5/2016 |
| CN | 106149286 A | 11/2016 |
| CN | 108823900 A | 11/2018 |
| CN | 103266452 B | 5/2019 |
| CN | 109972348 A | 7/2019 |
| CN | 110528230 A | 12/2019 |
| CN | 110735284 A | 1/2020 |
| CN | 111411478 A | 7/2020 |
| CN | 111549486 A | 8/2020 |
| WO | 2018114359 A1 | 6/2018 |

*Primary Examiner* — Jason Y Ko
(74) *Attorney, Agent, or Firm* — Brooks Kushman P.C.

(57) ABSTRACT

Systems and methods for improved laundry dosing are provided. An image of a detergent container captured by a user is received. Image recognition is performed on the image of the detergent container to identify a detergent to be used based on shape, color, text, and/or brand logo of the detergent container. Parameters of the detergent are identified based on the image recognition. A dose of the detergent is recommended and/or a controlled release of a dose of the detergent is performed for a laundry cycle of a laundry appliance according to the parameters.

19 Claims, 8 Drawing Sheets

FIG. 8

BETTER DOSING WITH A VIRTUAL AND ADAPTIVE LOW COST DOSER

TECHNICAL FIELD

Aspects of the disclosure generally relates to an improved adaptive dosing system for a laundry appliance.

BACKGROUND

Laundry treating appliances typically operate to treat laundry items by placing the laundry items in contact with treating fluid such as a detergent/water mixture. This mixture may sometimes be referred to as wash liquor. The laundry treating appliance may then provide relative motion between the laundry items and the fluid. A controller may be used to control a motor to rotate the laundry basket or drum according to one of the pre-programmed cycles of operation. The controller may also control a clothes mover provided within the laundry basket or drum and configured to impart mechanical energy to laundry items within the treating chamber according to a selected cycle of operation. The clothes mover can include multiple components, such as a base, which can be provided as an impeller plate, and a barrel, which can be provided as an agitator post.

Consumers are requested to add detergent during their clothes laundering to create the treating fluid. To do so, the consumer combines a supplier-recommended detergent dosage with washing machine dosage requirements. Each detergent supplier typically has their own recommendation on how to dose their detergent. In general, the recommended detergent dosage is a coefficient that states an amount of detergent to be used under some quantity of load. The dosage may account for factors such as load size, load amount, load level in the machine, and water level in the machine, among other factors.

SUMMARY

In one or more illustrative examples, a method for improved laundry dosing is provided. An image of a detergent container captured by a user is received. Image recognition is performed on the image of the detergent container to identify a detergent to be used based on the shape, color, text, and/or brand logo of the detergent container. Parameters of the detergent are identified based on the image recognition. A dose of the detergent is recommended for a laundry cycle of a laundry appliance according to the parameters.

In one or more illustrative examples, a system for improved laundry dosing is provided. The system includes a camera, a human machine interface (HMI), and a controller programmed to execute a dosage application to perform operations. The operations include to receive an image of a detergent container from the camera, perform image recognition on the image of the detergent container to identify a detergent to be used based on shape, color, text, and/or brand logo of the detergent container, identify parameters of the detergent based on the image recognition, and display, in the HMI, a recommendation of a dose of the detergent for a laundry cycle of a laundry appliance according to the parameters.

In one or more illustrative examples, non-transitory computer-readable medium includes instructions that, when executed by one or more processors, cause the one or more processors to perform operations including to receive an image of a detergent container from a camera; perform image recognition on the image of the detergent container to identify a detergent to be used based on shape, color, text, and/or brand logo of the detergent container; identify parameters of the detergent based on the image recognition; identify a dosage cup to be used to dispense the detergent; and visually recommend a dose of the detergent for a laundry cycle of a laundry appliance according to the parameters as a fill level of the dosage cup displayed in the shape and color of the dosage cup.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Consumers are requested to add the correct dose of detergent to a laundry treating appliance. The complexity of properly dosing a laundry load is a factor of there being multitude of detergent suppliers, detergent formulations, a lack of standardization, multiple washing machine capacities, different dispenser types, different types of clothes, and different soil level of the laundry load. This detergent dosing adds complexity of the washing process. The complexity inherent in correctly dosing a laundry load may cause a poor customer experience, including suboptimal cleaning of the laundry load. Detergent overdosing increases home expenses, while underdosing impacts cleaning performance.

As discussed in detail herein, an adaptive dosing system may include a laundry treating appliance, a mobile device having a digital camera, a dosage application to determine detergent dosage, connectivity and an HMI such as a screen of the mobile device. The consumer may scan a detergent bottle and the laundry treating appliance using the camera. The dosage application may utilize the captured images to determine the right dosage applicable to the laundry treating appliance. The information may be exchanged between the laundry treating appliance and mobile device through the connectivity to update the dosing rules in an automatic detergent dispenser or may be provided as a recommendation on the HMI. Further aspects of the disclosure are discussed in detail herein.

Figure 1:
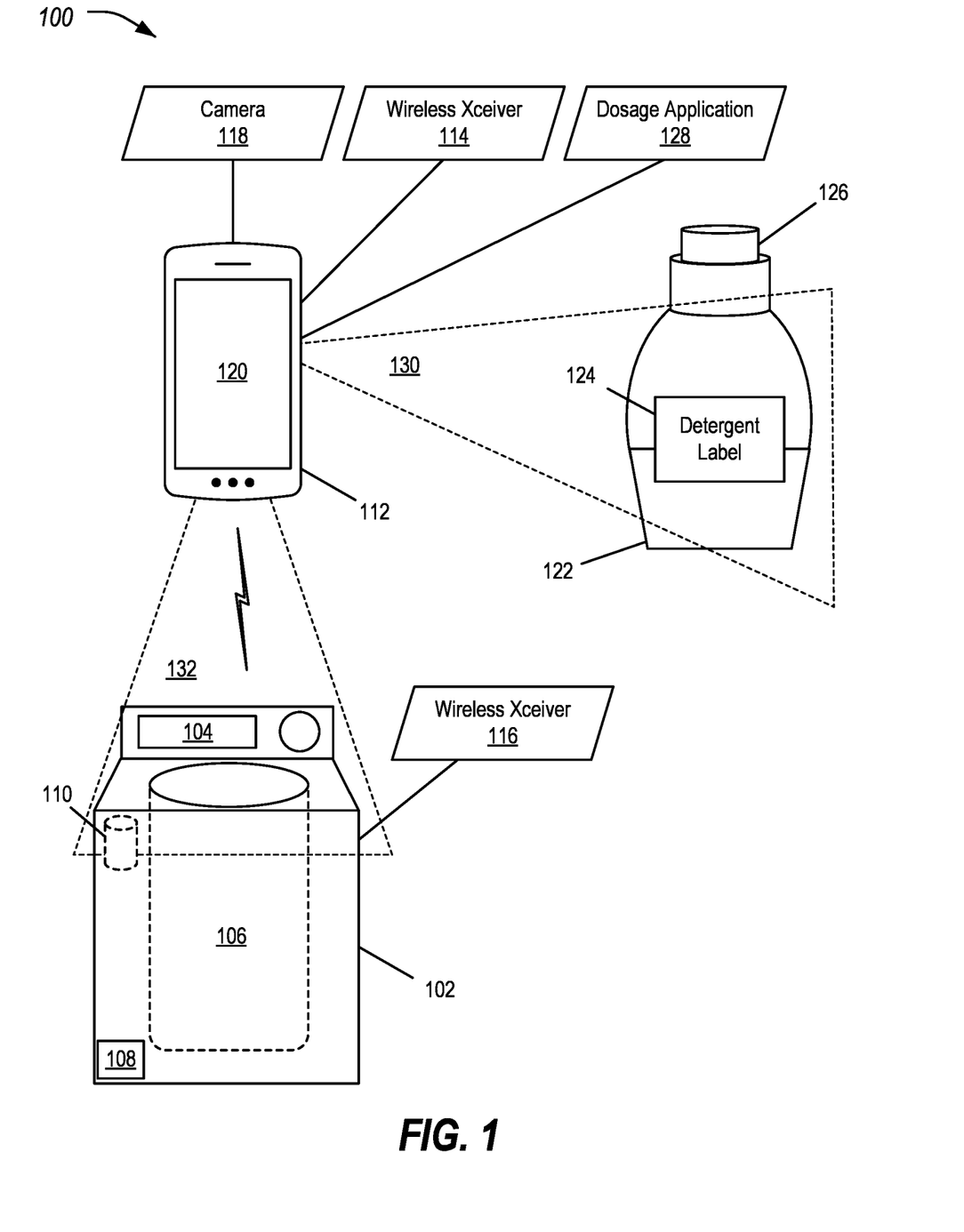
FIG. 1 illustrates an example simplified view of an adaptive dosing system for a laundry appliance.

FIG. 1 illustrates an example simplified view of an adaptive dosing system 100 for a laundry treating appliance 102. As shown, the adaptive dosing system 100 includes the laundry treating appliance 102 and a smartphone or other mobile device 112. The mobile device 112 is equipped with a camera 118 to facilitate the imaging of aspects of the laundry treating appliance 102 (such as the load level in the drum 106), and of a detergent bottle 122 (such as a shape of the detergent bottle 122 itself, information on the detergent label 124, the shape or design of a doser 126 integrated into a cap of the detergent bottle 122, etc.). The laundry treating appliance 102 may also include an automated detergent dispenser 110 for dosing detergent into the drum 106. The mobile device 112 may also include a wireless transceiver 114 configured for wireless communication with a corresponding wireless transceiver 116 of the laundry treating appliance 102. The mobile device 112 may have a human machine interface (HMI) 120 configured to display information with respect to the dosing. The laundry treating appliance 102 may also have a washer HMI 104 configured to display information with respect to the so you dosing.

The laundry treating appliance 102 may be any machine that treats articles such as clothing or fabrics. Examples of the laundry treating appliance 102 may include, but are not limited to, a vertical axis washing machine, a tumbling or stationary refreshing/revitalizing machine, an extractor, a non-aqueous washing apparatus, and a revitalizing machine. As used herein, the term vertical-axis washing machine refers to a washing machine having a rotatable drum 106 that rotates about a generally vertical axis relative to a surface that supports the washing machine. However, the rotational axis need not be perfectly vertical to the surface. For example, the drum 106 may rotate about an axis inclined relative to the vertical axis (e.g., with fifteen degrees of inclination being one example of the inclination).

The laundry treating appliance 102 includes a cabinet defined by a front wall, a rear wall, a pair of side walls and supporting a top wall. The HMI 104 may be located on the cabinet and may have various controls, which may be used to select a cycle of operation for the laundry treating appliance 102. The top wall may have an openable lid or door and may be selectively moveable between opened and closed positions to close an opening in the top wall. In the opened position, the door provides access to the interior of the cabinet.

The drum 106 may be disposed within the interior of the cabinet and to define a treating chamber for treating laundry. The drum 106 may be positioned within an imperforate tub. The drum 106 itself may include a plurality of perforations, such that liquid may flow between the tub and the drum 106 through the perforations. A clothes mover may be rotatably mounted within the drum 106 to impart mechanical agitation and energy to a load of laundry items placed in the drum 106 or the treating chamber according to a cycle of operation. The clothes mover assembly may be oscillated or rotated about its vertical axis of rotation during a cycle of operation to produce load motion effective to wash the load contained within the drum 106. The drum 106 and/or the clothes mover assembly may be driven by an electrical motor operably connected to the drum 106 and/or the clothes mover by a drive shaft.

A liquid supply and recirculation system may be provided to spray treating liquid, such as water or a combination of water and one or more wash aids (such as detergent, water softener, fabric softener, etc.), into the drum 106 and onto the laundry load. The liquid supply and recirculation system may be configured to supply treating liquid directly from a household water supply and/or from drum 106 and spray it onto the fabric load. The liquid supply and recirculation system may also be configured to recirculate treating liquid from the drum 106.

The laundry treating appliance 102 may further comprise a controller 108 coupled to various working components of the laundry treating appliance 102, such as the motor, pump, automated detergent dispenser 110, etc., to control the operation of the working components. The HMI 104 may be coupled to the controller 108 and may provide for input/output to/from the controller 108. The HMI 104 may allow a user to enter input related to the operation of the laundry treating appliance 102, such as selection and/or modification of an operation cycle of the laundry treating appliance 102, and receive output related to the operation of the laundry treating appliance 102. Examples, without limitation, of cycles of operation include wash, heavy duty wash, delicate wash, quick wash, refresh, rinse only, and timed wash. The automated detergent dispenser 110 may be configured to supply detergent into the liquid supply and recirculation system and therefore into the drum 106. The quantity to be supplied may be controlled by the controller 108 according to the selected cycle, load parameters, and/or type of detergent being used.

The mobile device 112 may include various types of computing apparatus, such as smartphones, tablets, smartwatches, or some other computing system and/or device. Computing devices, such as the mobile device 112, generally include a memory on which computer-executable instructions may be maintained, where the instructions may be executable by one or more processors of the computing device. Such instructions and other data may be stored using a variety of computer-readable media. A computer-readable medium (also referred to as a processor-readable medium or storage) includes any non-transitory (e. g., tangible) medium that participates in providing data (e.g., instructions) that may be read by a computer (e.g., by the processor of the mobile device 112). In general, processors receive instructions, e.g., from the memory via the computer-readable storage medium, etc., and executes these instructions, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, JavaScript, Perl, Structured Query Language (SQL), etc.

The mobile device 112 may include a wireless transceiver 114 configured to communicate with a corresponding wireless transceiver 116 of the laundry treating appliance 102. In some cases, the devices having permission to connect to the laundry treating appliance 102 using the wireless transceiver 116 may be identified by the laundry treating appliance 102 according to paired device data maintained to the controller 108. The paired device data may indicate, for example, the unique device identifiers of mobile devices 112 (and/or wireless transceivers 114 of the mobile devices 112) previously paired with the laundry treating appliance 102, secret information shared between the paired device and the laundry treating appliance 102 such as link keys, and/or personal identification numbers (PINs), and most recently used or device priority information. This information may allow the laundry treating appliance 102 to automatically reconnect to the mobile devices 112 matching data in the paired device data without user intervention.

The mobile device 112 may also include a camera 118 configured to capture image date of the surroundings of the mobile device 112. In many examples the image data may be stored as a rectangular array of pixels, where each pixel corresponds to a portion of the image. In some examples, the image data may be a single color or channel, forming a single matrix of pixels. In other examples, the image data may be a color image having separate pixel values for multiple color channels, such as red, green, and blue.

The mobile device 112 may also include an HMI 120 configured to display information to the user of the mobile device 112. The HMI 120 may include one or more displays, screens, buttons, microphones, speakers, or other controls to facilitate interaction of a user with the mobile device 112. In many examples, the HMI 120 may include a display that is touch-sensitive, which may be further configured to receive input from the user in addition to showing information.

The detergent bottle 122 may be a container used to hold detergent for use by the laundry treating appliance 102. The detergent bottle 122 may be of various shapes, sizes, and capacities. The detergent bottle 122 may include a detergent label 124 onto which various information about the detergent is printed. This information may include, as some non-limiting examples, a brand of the detergent, a name of the detergent, a strength of the detergent, recommended dosage information for use of the detergent for a laundry load, a barcode identifying a stock-keeping unit (SKU) of the detergent, etc.

The detergent bottle 122 may also include or otherwise be associated with a doser 126. The doser 126 may have one or more marks or other measurements that may be used to allow a user to measure out a defined amount of the detergent. In some examples the doser 126 may be integrated into the cup of the detergent bottle 122. In other examples, the doser 126 may be a separate cup or other apparatus that may hold a measured quantity of the detergent.

A dosage application 128 may be an example of an application installed to the storage of the mobile device 112. When executed by the mobile device 112, the dosage application 128 may facilitate the example processes discussed in detail herein with respect to FIGS. 2-6. As explained in further detail, the dosage application 128 may include instructions that cause the mobile device 112 to perform operations including to capture imaging of the laundry treating appliance 102 (e.g., as shown in FIG. 1 as the camera view 130, capture imaging of the detergent bottle 122 (e.g., as shown in FIG. 1 as the camera view 132), and determine a dosage of detergent applicable to the laundry treating appliance 102.

Figure 2:
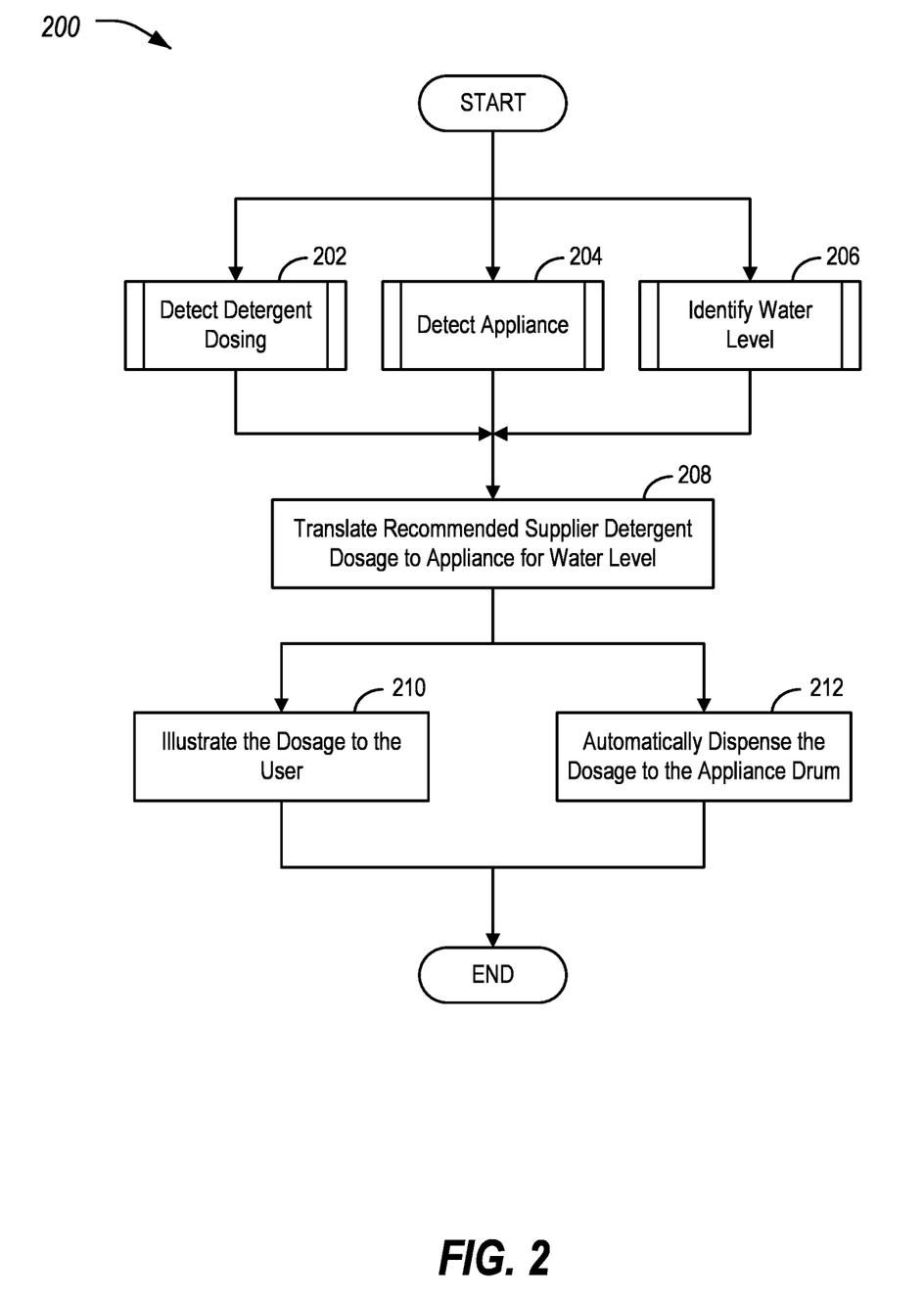
FIG. 2 illustrates an example process for performing adaptive dosing.

FIG. 2 illustrates an example process 200 for performing adaptive dosing. As shown, the process 200 may include multiple subprocesses that may be executed concurrently and/or in various orders. These subprocesses may include to detect the detergent dosing as shown at operation 202, to detect the laundry treating appliance 102 as shown at operation 204, and to identify the water level in the laundry treating appliance 102 as shown at operation 206.

Figure 3:
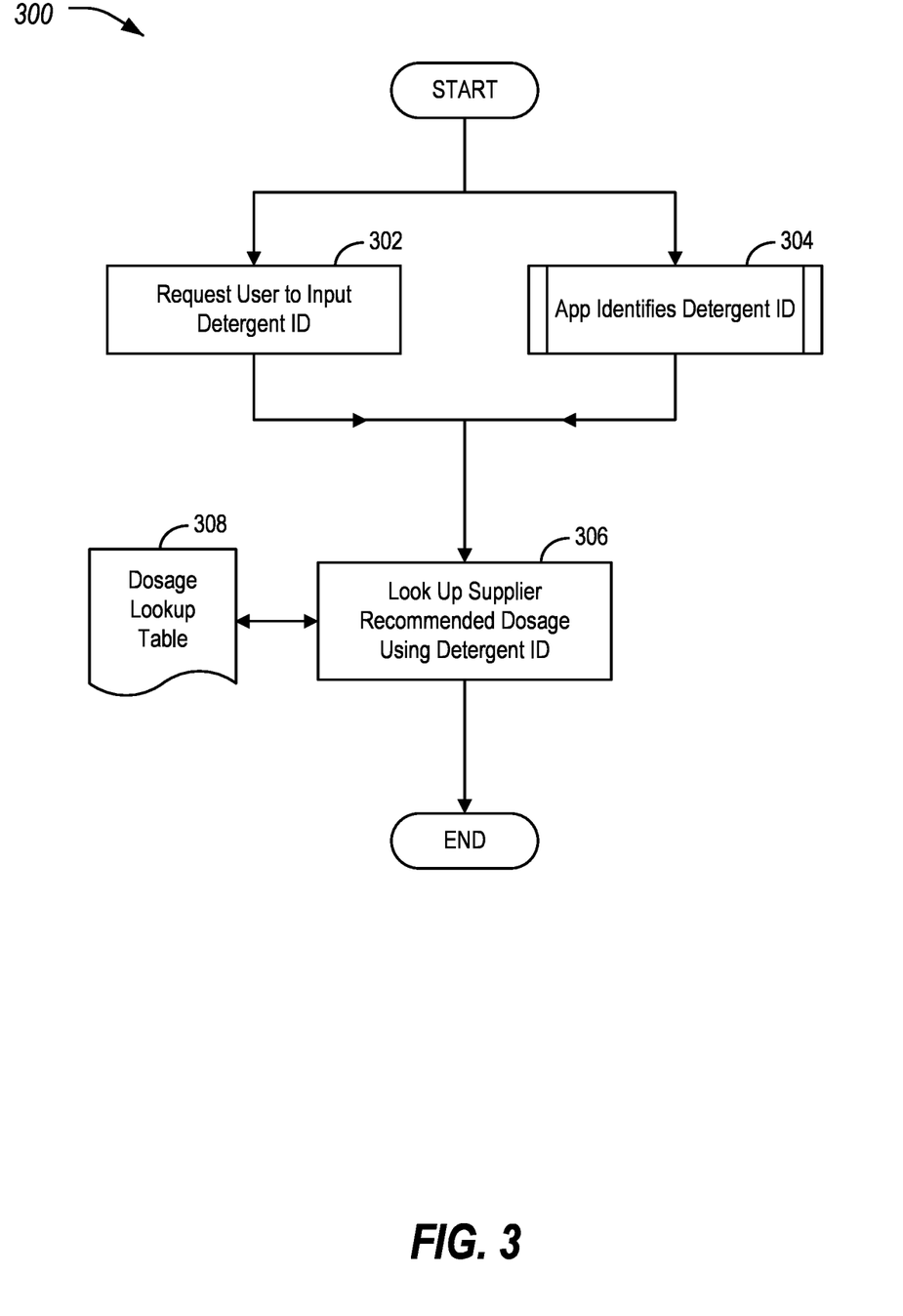
FIG. 3 illustrates an example subprocess of the adaptive dosing process for determining a dosage table.

At operation 202, the detergent is detected. Referring more specifically to FIG. 3, and with continued reference to FIG. 2, FIG. 3 illustrates the example subprocess 300 of the adaptive dosing process 200 for determining the detergent ID.

In some examples, the subprocess 300 may begin, as shown at operation 302, with a request to the user to input a detergent ID corresponding to the detergent to be used (e.g., as contained in the detergent bottle 122 or the automated detergent dispenser 110). However, in some cases the user may not have or may not choose to input the detergent ID. In such examples, as shown at operation 304, the subprocess 300 may in the alternative detect the detergent ID. In some examples, the detergent ID may be the SKU of the detergent. In other examples, the detergent ID may be an arbitrary identifier unique to the adaptive dosing system 100.

Figure 4:
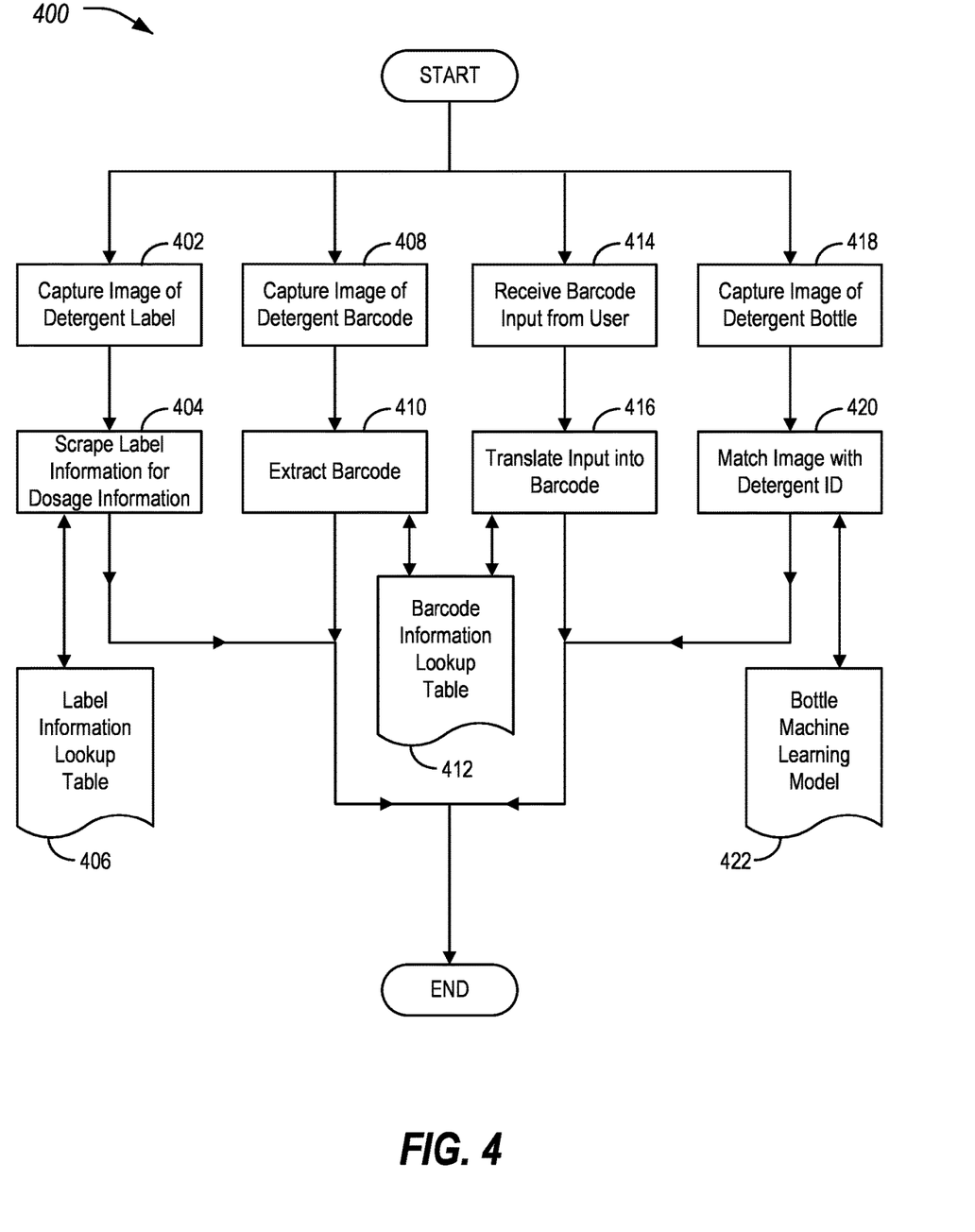
FIG. 4 illustrates an example subprocess of the adaptive dosing process for detecting a detergent identifier (ID)

Referring more specifically to FIG. 4, and with continued reference to FIGS. 2-3, FIG. 4 illustrates the example subprocess 400 for detecting a detergent ID. As shown, the detergent ID may be detected through one or more approaches. Using the detergent ID, parameters of the detergent may be identified, such as a dosage table for use of the detergent based on laundry cycle, water level, load level, level of soil of the laundry load, etc.

In one example, as shown at operation 402, the mobile device 112 may capture an image of the detergent label 124. For instance, the mobile device 112 may instruct the user via the HMI 120 to utilize the camera 118 to capture the image of the detergent label 124.

At operation 404, based on the captured image, the mobile device 112 may scrape the label for dosage information. This scraping may include optical character recognition (OCR) performed on the captured image to capture graphical and/or textual information from the detergent label 124. The textual information may specify, for example, the brand name of the detergent and/or an identifier of the detergent, as printed on the detergent label 124. Additionally, the mobile device 112 may scrape the label for dosage information printed onto the label. For instance, the mobile device 112 may capture textual information from the label indicating quantities of detergent for different quantities of laundry, types of laundry, and/or level of dirtiness of the laundry load. In one example this information specifies fluid quantities, number of detergent pods, and/or levels of fill of a doser for different levels of loads or soil. In one non-limiting example, a label may specify a first defined pod quantity, fluid ounces, or a first fill line of a doser for a small load, a second defined pod quantity, fluid ounces, or second fill line of the doser for a medium load, and a third defined pod quantity, fluid ounces, or third fill line of the doser for a large load.

As the information is being extracted, a database may be built of detergent IDs and corresponding dosage information. By using such a database, the accuracy of the scraping process may be improved. For instance, if there is a scraping issue caused by a label being partially obscured or eligible due to some other factor, then the mobile device 112 may utilize the database to retrieve some or all of the dosage information. For instance, the mobile device 112 may look up scraped information in a label information lookup table 406 to determine the detergent ID and/or dosing information. The label information lookup table 406 may include names or other attributes of detergents as well as the detergent IDs corresponding to the names or other attributes. In some examples, the label information lookup table 406 may be stored on the mobile device 112 itself. In some examples, the label information lookup table 406 may be queried from a cloud server by the mobile device 112.

In another approach to determining the detergent ID, as shown at operation 408, the mobile device 112 may determine the detergent ID by capturing an image of a barcode of the detergent bottle 122. For instance, the mobile device 112 may instruct the user via the HMI 120 to utilize the camera 118 to capture the barcode of the detergent label 124. At operation 410, the mobile device 112 extracts the barcode from the captured image. In an example the mobile device 112 may use a barcode library or other image recognition system to read the barcode out of the image into a numerical or textual form. The mobile device 112 may look up the barcode information in a barcode information lookup table 412 to determine the detergent ID. For instance, the barcode information lookup table 412 may map barcode to the detergent IDs used by the adaptive dosing system 100. In some examples, the barcode information lookup table 412 may be stored to the mobile device 112 itself. In some examples, the barcode information lookup table 412 may be queried from a cloud server by the mobile device 112.

In yet another approach to determining the detergent ID, as shown at operation 414, the mobile device 112 may request and receive input of the barcode from the user. In an example, the user may type in the barcode using a keyboard of the mobile device 112 (e.g., an onscreen keyboard, a physical keyboard etc.). In such an example at operation 416 may look up the barcode information in the barcode information lookup table 412 to determine the detergent ID. In another example, the mobile device 112 may receive barcode input as audio input read by the user. In such an example, speech-to-text voice recognition techniques may be used to convert the barcode into numerical or textual information to look up in the barcode information lookup table 412 to determine the detergent ID.

In yet another approach to determining the detergent ID, as shown at operation 418, the mobile device 112 may determine the detergent ID by capturing an image of the detergent bottle 122 itself. These characteristics may include, as some non-limiting examples, brand identifying marks, brand identifying color, bottle shape, or any other specific visual identification that may be used to determine the specific detergent. In such an example, responsive to capturing the image of the detergent bottle 122, at operation 420 the mobile device 112 may perform image recognition on the image to identify the specific product of the detergent bottle 122. For instance, the mobile device 112 may utilize a bottle identifying machine learning model 422 trained on images of different detergent bottles 122 to receive the image of the detergent bottle 122 and determine a most likely match.

It should be noted that multiple such approaches may be used to determine the detergent ID. For instance, two or more of: scraping of bottle information, barcode identifier, and or visual identification of characteristics of the bottle may be used in combination. Regardless of approach, the subprocess 400 determines the detergent ID. Referring back to FIG. 3, responsive to completion of operation 304 (or operation 302 discussed earlier), at operation 306 the mobile device 112 looks up the detergent ID in a dosage lookup table 308 to identify the recommended dosage information for the detergent as determined by the supplier of the detergent. As with the other lookup tables, the dosage lookup table 308 may be stored to the mobile device 112 or stored to a cloud server accessible by the mobile device 112. Referring back to FIG. 2, the detergent dosing aspect of the process 200 shown at operation 202 is completed.

Figure 5:
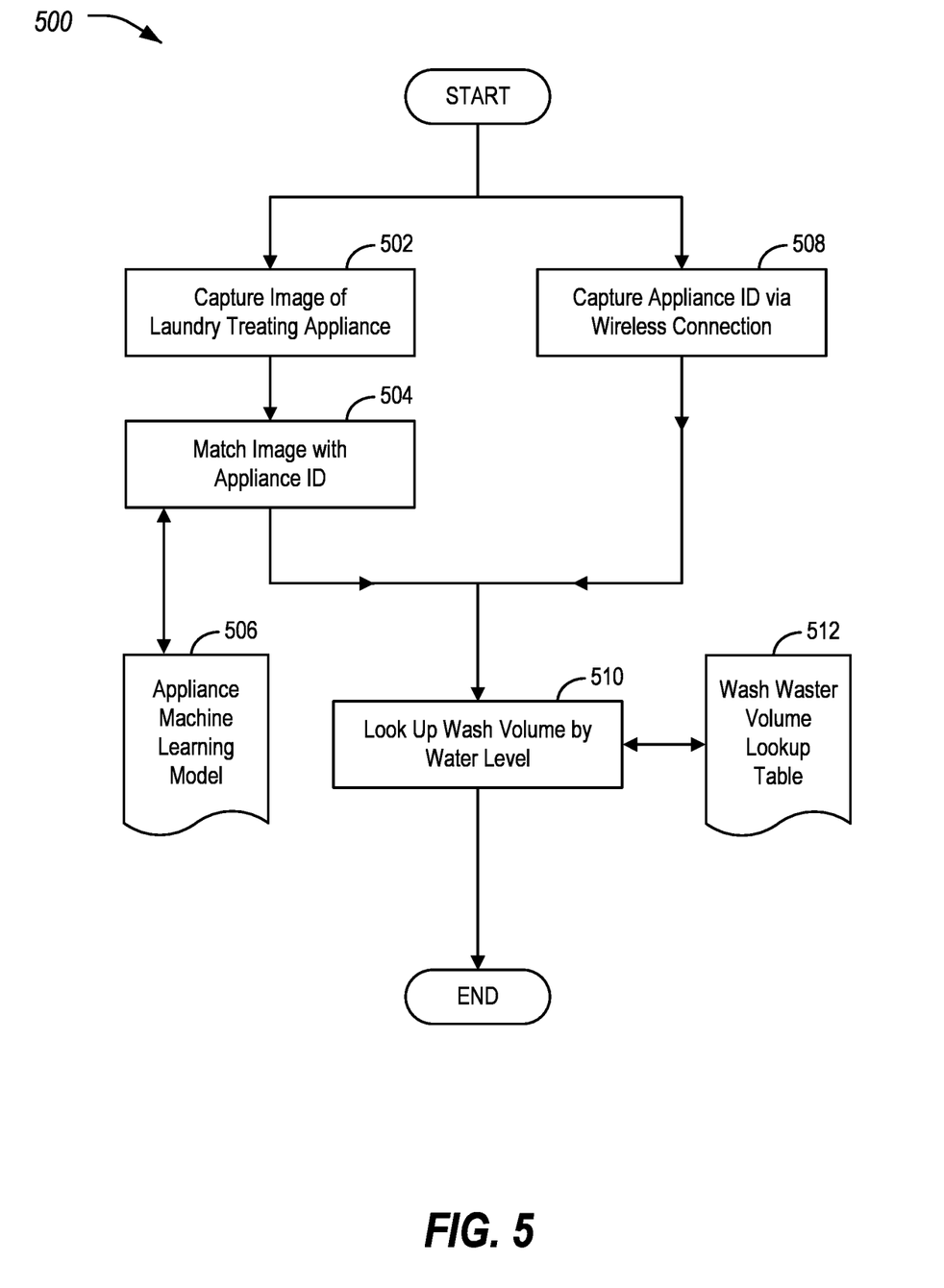
FIG. 5 illustrates an example subprocess of the adaptive dosing process for determining a wash volume.

As noted above, at operation 204 the mobile device 112 performs a subprocess 500 to detect the laundry treating appliance 102 as shown in FIG. 5. Referring to FIG. 5, and with continuing reference to FIG. 2, the mobile device 112 may perform various techniques to identify an appliance ID of the laundry treating appliance 102.

As a possible approach, at operation 502 the mobile device 112 captures an image of the laundry treating appliance 102. For instance, the mobile device 112 may instruct the user via the HMI 120 to utilize the camera 118 to capture an image of the laundry treating appliance 102. In such an example, responsive to capturing the image of the laundry treating appliance 102, at operation 504 the mobile device 112 performs image recognition on the captured image to identify the specific model of laundry treating appliance 102. For instance, the mobile device 112 may utilize an appliance machine learning model 506 trained on images of different laundry treating appliance 102 to receive the image of the laundry treating appliance 102 and determine a most likely match. The most likely match may be returned from the appliance machine learning model 506 as an appliance ID that is indicative of the specific model of laundry treating appliance 102. In an example, the appliance ID may be a model number of the appliance ID. In other examples, the appliance ID may be an arbitrary identifier unique to the adaptive dosing system 100.

As another possible approach, at operation 508 the mobile device 112 captures the appliance ID from the laundry treating appliance 102. For instance, the mobile device 112 may have been paired with the laundry treating appliance 102 and may automatically reconnect to the mobile devices 112 to retrieve the appliance ID (e.g., via a connection formed between the wireless transceivers 114, 116). In another example, the laundry treating appliance 102 may broadcast the appliance ID regardless of whether the mobile device 112 has previously been paired to the mobile device 112.

Regardless of approach, at operation 510 the mobile device 112 looks up the wash volume of the laundry treating appliance 102 identified by the appliance ID. For instance, the mobile device 112 may access a wash water volume lookup table 512 storing a mapping of appliance ID to characteristics such as water volume of the drum 106 of the laundry treating appliance 102 and/or load capacity of the laundry treating appliance 102. The wash volume may be used to allow the mobile device 112 to estimate the amount of wash water in the laundry treating appliance 102 for a full drum 106, as well as for a partially full drum 106 (e.g., based on the depth or other dimensions of the drum 106 determined based on the appliance ID). Referring back to FIG. 2, the appliance detection subprocess 500 of the process 200 shown at operation 204 is completed.

Figure 6:
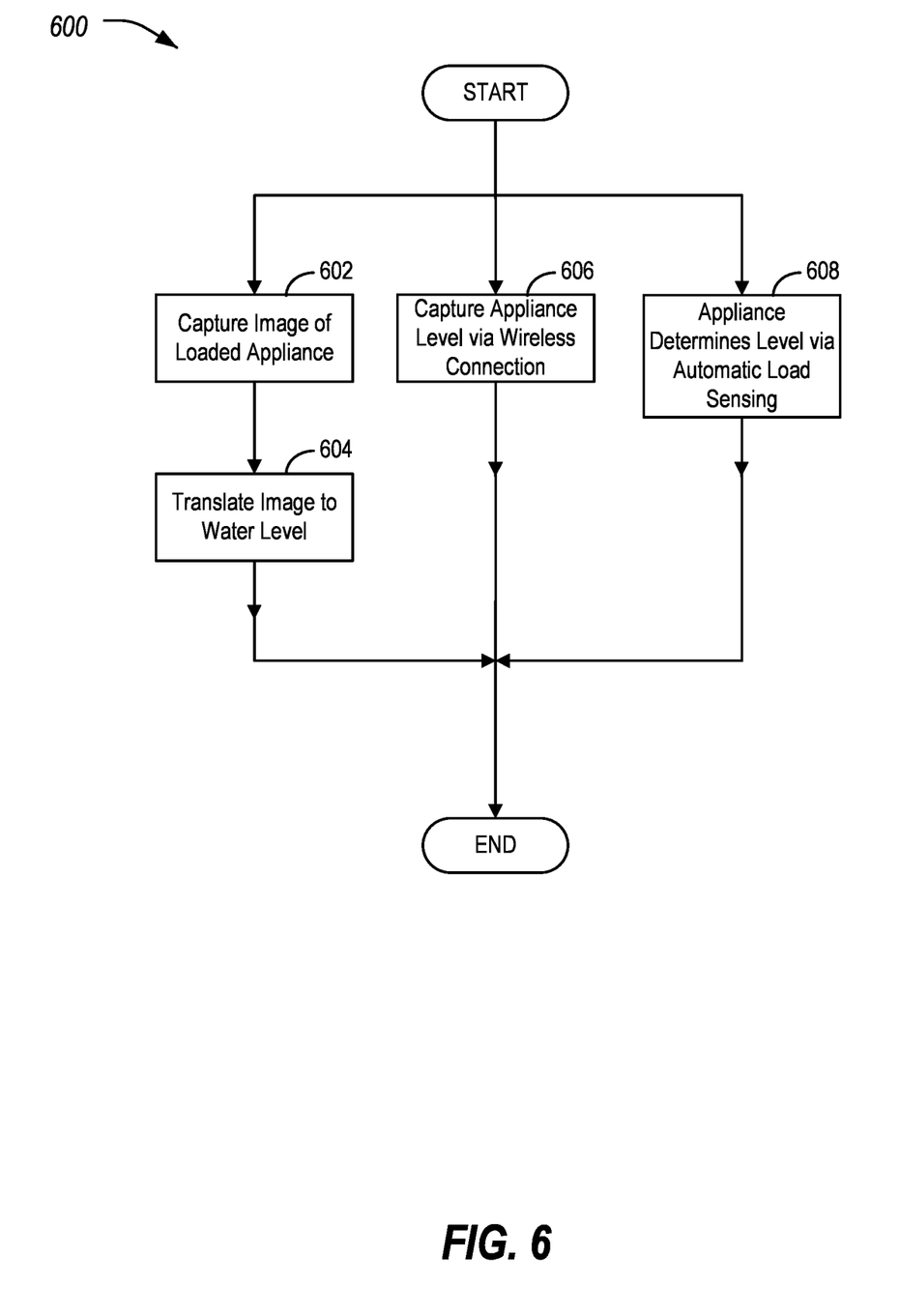
FIG. 6 illustrates an example subprocess of the adaptive dosing process for determining a wash level.

At operation 206, the mobile device 112 performs a subprocess 600 to identify the water level in the laundry treating appliance 102 as shown in FIG. 6. Referring to FIG. 6, and with continuing reference to FIG. 2, the mobile device 112 may perform various techniques to identify the water level within the laundry treating appliance 102.

As a possible approach, at operation 602 the mobile device 112 captures an image of the laundry treating appliance 102. For instance, the mobile device 112 may instruct the user via the HMI 120 to utilize the camera 118 to capture an image of the drum 106 of the laundry treating appliance 102 once it has been loaded. In such an example, responsive to capturing the image of the laundry treating appliance 102, at operation 604 the mobile device 112 may perform image recognition on the image to identify the level of the water within the drum 106 and/or the load size within the drum 106. In an example, the drum 106 may include internal markings that may be scraped by the mobile device 112 using various image recognition techniques. Based on which and/or how many internal markings are shown above the water line, the mobile device 112 may identify the level of fill of the laundry treating appliance 102.

In another example, the mobile device 112 may perform a cylindrical diameter fitting of the contents of the drum 106 to a fitted ellipse of the top of the drum 106, such that based on those two measures the mobile device 112 may determine a maximum distance between two points of the ellipses. Or, based on those two measures the mobile device 112 may determine a minimum distance between two points of the ellipses. This distance, in combination with the dimensions of the drum 106 as identified based on the appliance ID, may allow the mobile device 112 to determine the level of contents in the drum 106.

In another example, the mobile device 112 may instruct the user to capture an image of the HMI 104 of the laundry treating appliance 102. Based on such an image, the mobile device 112 may identify the selected cycle, wash modifiers such as extra soiled or delicate, or other information about the chosen cycle. As different cycles and wash modifiers may provide different amounts of water, the determination of the cycle and wash modifiers in use may be used to infer the level of water in the drum 106.

As another possible approach, at operation 606 the mobile device 112 requests water level information from the laundry treating appliance 102 via wireless connection between the mobile device 112 and the laundry treating appliance 102. The water level information may include information such as the selected wash cycle, wash modifiers, or based on the amount of water or time of water being released into the drum 106. Regarding the wireless connection, the mobile device 112 may have been paired with the laundry treating appliance 102 and may automatically reconnect to the mobile devices 112 to retrieve the water level (e.g., via a connection formed between the wireless transceivers 114, 116). In another example, the laundry treating appliance 102 may broadcast the water level information regardless of whether the mobile device 112 has previously been paired to the mobile device 112. In some cases, the water level information may indicate the amount of water in the drum 106. In other examples, the mobile device 112 may utilize the water level information and other information to determine the water level. For instance, the mobile device 112 may utilize information indicative of the selected cycle and the appliance ID of the laundry treating appliance 102 to look up the amount of water provided by the type of the laundry treating appliance 102 for the selected cycle.

At yet another example, at operation 608 the laundry treating appliance 102 itself may determine the water level. In one such example, the laundry treating appliance 102 may determine the water level based on a float or other measuring sensor of the drum 106. This information may be provided to the mobile device 112. Referring back to FIG. 2, the water level determining aspect of the process 200 shown at operation 206 is completed.

At operation 208, the mobile device 112 translates the recommended supplier detergent dosage into an amount of the detergent (as determined by operation 202) to be provided to the laundry treating appliance 102 as determined by operation 204) for the water level (as determined by operation 206). For instance, the mobile device 112 the dosage information for the detergent ID may indicate an amount of product to use for different amounts of water in the laundry treating appliance 102, and the mobile device 112 may select the correct amount of detergent based on the determined amount of water and detergent requirements of the determined laundry treating appliance 102.

Figure 7:
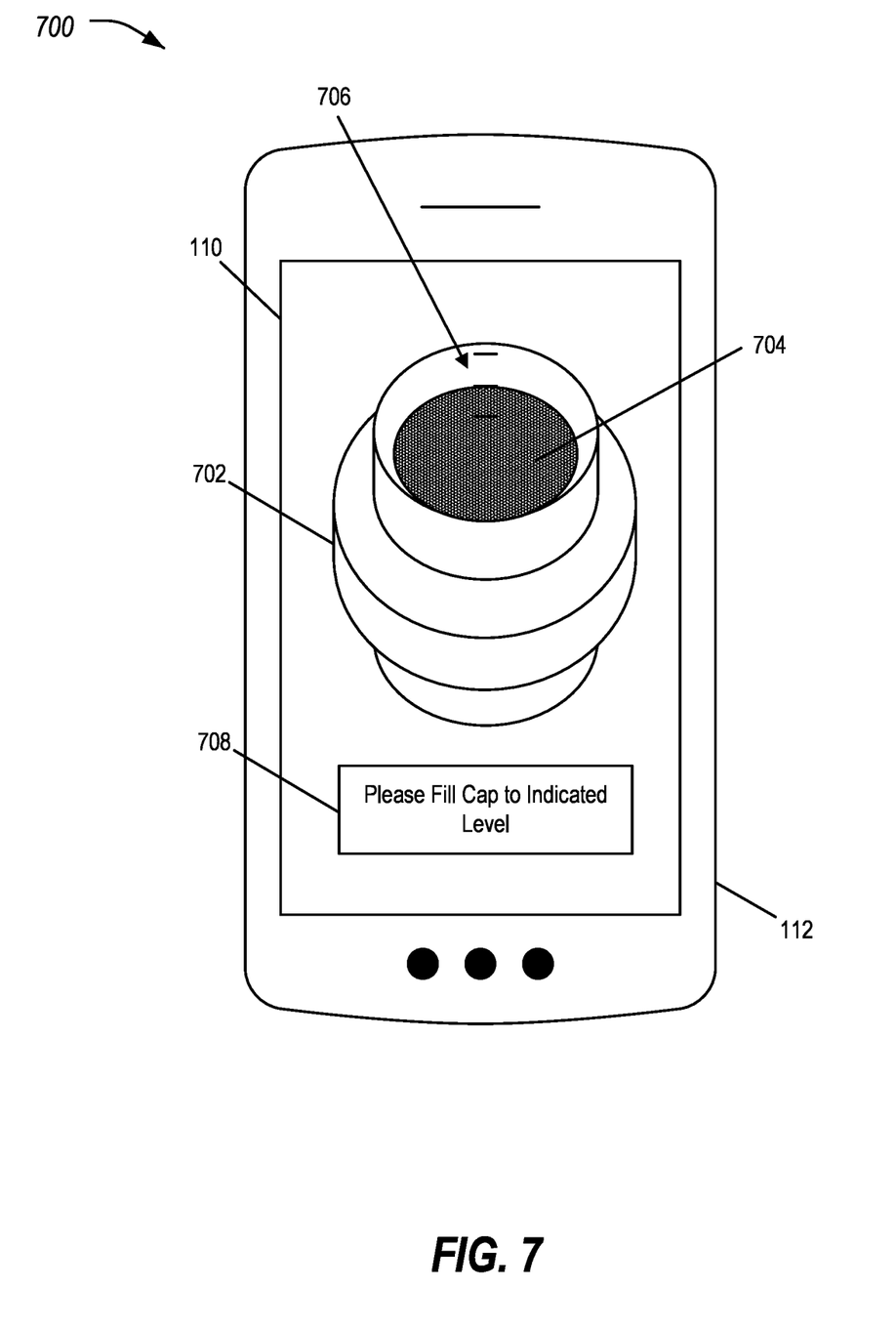
FIG. 7 illustrates an example HMI for illustrating a determined dosage to the user.

This information may be used to illustrate the correct dosage as indicated at operation 210. Referring to FIG. 7, an example HMI 120 for illustrating the determined dosage to the user via the mobile device 112 is shown. As shown, a doser representation 702 of the doser 126 to be used is illustrated in the HMI 120. The level of detergent 704 to be added to the doser 126 is also illustrated in the HMI 120. In many cases, the doser 126 may include marking to aid in the measuring of the accurate amount of detergent. These markings may also be represented in the HMI 120, as shown as marking 706. The HMI 120 may additionally provide a message 708 to indicate to the user that this is the amount of detergent to be provided into the drum 106.

In some examples, the doser 126 shown in the HMI 120 may be a doser 126 that came with the detergent, such as the cap of the detergent or a measuring cup that came with the detergent. This image of the doser 126 may be accessed by the mobile device 112 based on a set of images of dosers 126 indexed to the detergent ID. Thus, the mobile device 112 may automatically show the user the correct dosage using the doser 126 that the user already has.

In another example, the doser 126 shown in the HMI 120 may be a doser 126 that is an accessory that comes with or can be purchased for the laundry treating appliance 102. In such an example, the user may be able to use a standardized doser 126 to correctly measure out and apply the correct amount of detergent.

In yet further examples, the HMI 120 may include an option to allow the user to select from different images of dosers 126, such that the user can select the doser 126 that he or she has. As a variation on such an approach, the mobile device 112 may allow the user to capture an image of his or her doser 126 and may utilize a machine learning model trained on images of different dosers 126 to receive the image of the doser 126 and determine a most likely match. The matching doser 126 may accordingly be used as the doser representation 702 in the HMI 120.

In some examples, as illustrated the level of the detergent in the doser 126 may be shown as a static level. In other examples, the HMI 120 may additionally or alternately illustrate an animation of the user filling the doser 126 to the correct level.

Referring back to FIG. 2, additionally or alternatively to illustrating the dosage to the user as shown at operation 210, at operation 212 the laundry treating appliance 102 may automatically dispense the determined dosage into the drum 106. For instance, the laundry treating appliance 102 may receive the determined dosage from the mobile device 112 and may utilize the automated detergent dispenser 110 to apply the determined dosage to the drum 106. In one example, the laundry treating appliance 102 may utilize a predefined pumping speed of the automated detergent dispenser 110 to determine an amount of time to run the automated detergent dispenser 110 to dispense the correct amount of detergent.

Thus, the adaptive dosing system 100 may operate to determine the correct dosage applicable to the laundry treating appliance 102 using a mobile device 112 executing the dosage application 128 having a digital camera 118. The correct dosage information may accordingly be exchanged between the laundry treating appliance 102 and mobile device 112 through the connectivity to update the dosing rules in an automated detergent dispenser 110 or may be provided as a recommendation on the HMI 120.

Variations on the disclosed approach are possible. In one example, the dosage recommendations may be stored in a history (e.g., to the memory of the mobile device 112). This history may be maintained for reuse to speed up the configuration of the laundry treating appliance 102. For instance, the appliance ID and/or the detergent ID may be stored for future use.

In another example, analytics may be collected based on the usage of the adaptive dosing system 100. For instance, the mobile device 112 may pass information to a cloud system, such as which detergent was used (e.g., the detergent ID), what cycle was used, what type of laundry treating appliance 102 appliance ID was used (e.g., the appliance ID). This information may be used, for instance, to determine popular combinations of detergents, cycles, and/or laundry treating appliance 102. Having such information, the mobile device 112 may be able to recommend to a user a specific detergent that is popular for use with the user's laundry treating appliance 102 and/or for the cycle or level of load that the user is washing. In yet a further example, this information may be provided to detergent manufactures or other parties to allow those parties to better understand how their products are used. This may be done, for example, in exchange for compensation to the owner of the cloud system, which may be, for instance, the manufacturer of the laundry treating appliances 102.

The adaptive dosing system 100 may also allow the manufacturer to recommend a detergent of a brand of the manufacturer, as well as dosage information of that detergent as commonly used based on the determined analytics. This may allow for the adaptive dosing system 100 to provide a user with an incentive to use the manufacturer's product, as the dosage information may be specifically tailored to that product.

While in many examples herein the product being used is a detergent, it should be noted that the adaptive dosing system 100 is not limited to laundry detergents. A similar approach may additionally or alternately be used for fabric softener, stain remover, or other products that may be included in the wash water mixture. In a specific example, in some cases the adaptive dosing system 100 may further account for water properties of water used for the laundry cycle. For instance, if the water is excessively hard (e.g., as determined based on user input or via water quality sensors), then the adaptive dosing system 100 may additionally offer supplemental chemistry based on the water properties of water used for the laundry cycle. In some cases, the properties of the water may also affect the amount of primary detergent to be recommended as well.

It should also be noted that the disclosed approach is not limited to use for laundry treating appliances 102. For instance, the disclosed techniques are applicable to other types of appliances that require dosage control, such as detergent and/or spot remover product for a dishwasher.

Figure 8:
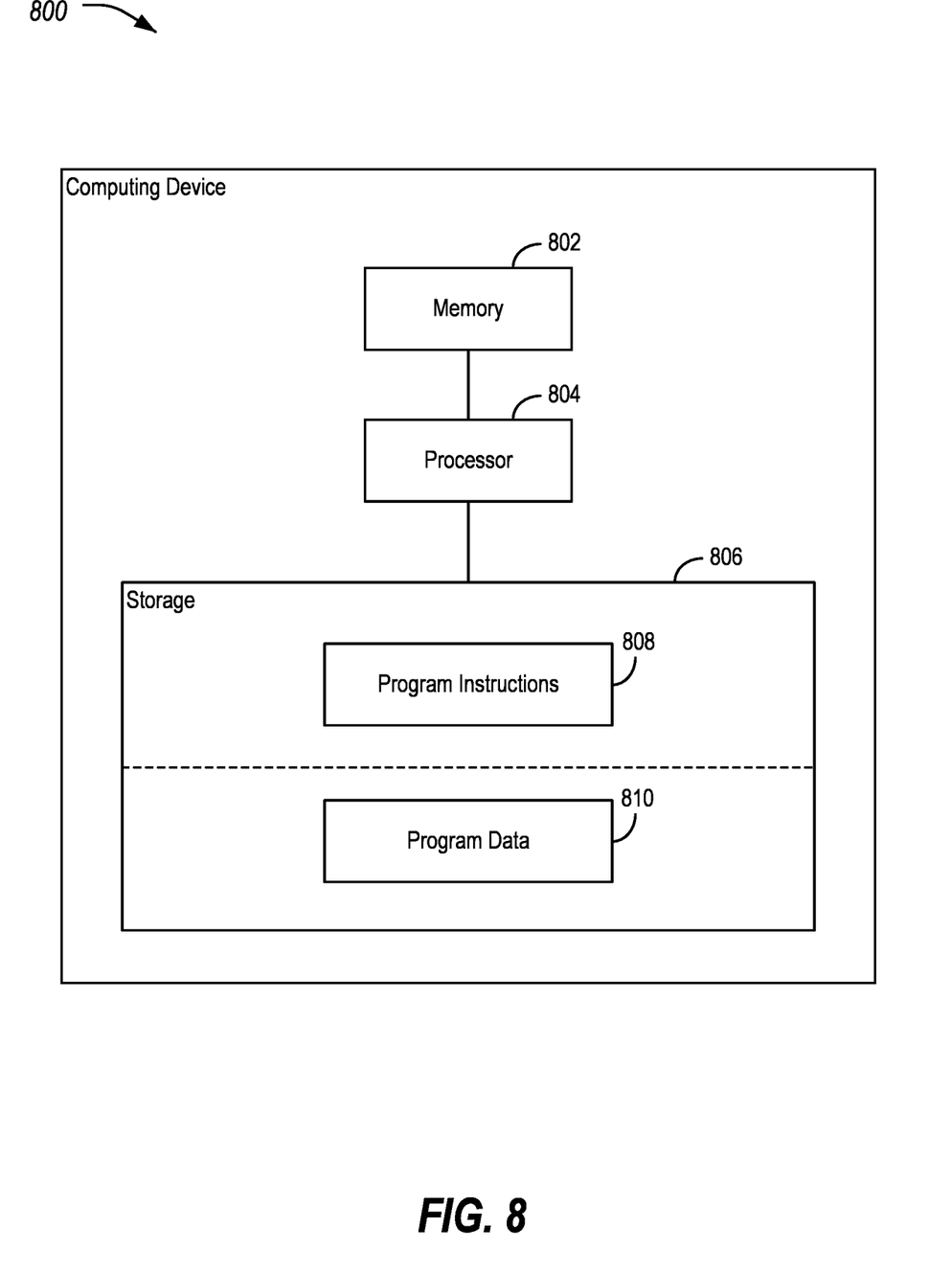
FIG. 8 illustrates an example computing device for use in the adaptive dosing system.

FIG. 8 illustrates an example computing device 800 for use in the adaptive dosing system 100. Devices discussed herein, such as the controller 108 of the laundry treating appliance 102 and mobile device 112 may include devices such as the computing device 800. Likewise, the operations performed herein, such as those of the process 200 and the subprocesses 300-600, may be implemented with one or more such computing devices 800. The computing device 800 may include memory 802, processor 804, and non-volatile storage 806. The processor 804 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 802. The memory 802 may include a single memory device or a number of memory devices including, but not limited to, random access memory (RAM), volatile memory, non-volatile memory, static random-access memory (SRAM), dynamic random access memory (DRAM), flash memory, cache memory, or any other device capable of storing information. The non-volatile storage 806 may include one or more persistent data storage devices such as a hard drive, optical drive, tape drive, non-volatile solid-state device, cloud storage or any other device capable of persistently storing information.

The processor 804 may be configured to read into memory 802 and execute computer-executable instructions residing in program instructions 808 of the non-volatile storage 806 and embodying algorithms and/or methodologies of one or more embodiments. The program instructions 808 may include operating systems and applications. The program instructions 808 may be compiled or interpreted from computer programs created using a variety of programming languages and/or technologies, including, without limitation, and either alone or in combination, Java, C, C++, C#, Objective C, Fortran, Pascal, Java Script, Python, Perl, and SQL. The memory 802 may also store program data 810, such as the lookup tables, IDs, and machine learning models discussed herein.

Upon execution by the processor 804, the computer-executable instructions of the program instructions 808 may cause the computing device 800 to implement one or more of the algorithms and/or methodologies disclosed herein. The non-volatile storage 806 may also include data supporting the functions, features, and processes of the one or more embodiments described herein.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for improved laundry dosing, comprising:
receiving an image of a detergent container captured by a user;
performing image recognition on the image of the detergent container to identify a detergent to be used based on one or more of shape, color, text, and/or brand logo of the detergent container;
identifying parameters of the detergent based on the image recognition; and
recommending and/or controlling release of a dose of the detergent for a laundry cycle of a laundry appliance according to the parameters.

2. The method of claim 1, further comprising:
providing a custom dosage cup having dosing markings; and
visually recommending and/or controlling release of the dose of the detergent as a fill level of the custom dosage cup with respect to the dosing markings.

3. The method of claim 1, further comprising:
identifying a cap of the detergent container according to the image recognition;
displaying a dosage cup in the shape and color of the cap of the detergent container; and
visually recommending and/or controlling release of the dose of the detergent as a fill level of the dosage cup.

4. The method of claim 1, further comprising:
identifying a supplemental chemistry based on the parameters of the detergent; and
recommending and/or controlling release of a dose of the supplemental chemistry for the laundry cycle according to parameters of the supplemental chemistry.

5. The method of claim 4, wherein the supplemental chemistry is a fabric softener.

6. The method of claim 4, further comprising:
visually recommending and/or controlling release of the dose of the detergent as a fill level of a dosage cup; and
visually recommending and/or controlling release of the dose of the supplemental chemistry as a second fill level of the dosage cup.

7. The method of claim 4, further comprising identifying the supplemental chemistry based on water properties of water used for the laundry cycle.

8. The method of claim 1, wherein the detergent is a first detergent, the parameters are first parameters, and further comprising:
identifying second parameters of a second detergent; and
recommending use of the first detergent or the second detergent based on the first parameters, the second parameters, and identified conditions of the laundry appliance.

9. The method of claim 8, wherein the identified conditions include one or more of load level of the laundry appliance, water properties of water used for the laundry appliance, or level of soiling of laundry items in the laundry appliance.

10. A system for improved laundry dosing, comprising:
a camera;
a human machine interface (HMI); and
a controller programmed to execute a dosage application to perform operations including to:
receive an image of a detergent container from the camera,
perform image recognition on the image of the detergent container to identify a detergent to be used based on shape, color and/or brand logo of the detergent container, identify parameters of the detergent based on the image recognition, and one or more of
- display, in the HMI, a recommendation of a dose of the detergent for a laundry cycle of a laundry appliance according to the parameters, or
- control release of a dose of the detergent for a laundry cycle of a laundry appliance according to the parameters.

11. The system of claim 10, wherein the controller is programmed to execute the dosage application to perform operations including to visually recommend, in the HMI, the dose of the detergent as a fill level of a representation of a custom dosage cup having predefined dosing markings, the dose of the detergent being illustrated at a level with respect to the dosing markings.

12. The system of claim 10, wherein the controller is programmed to execute the dosage application to perform operations including to:
- identify a cap of the detergent container according to the image recognition;
- display a dosage cup in the shape and color of the cap of the detergent container; and
- visually recommend and/or control release of the dose of the detergent as a fill level of the dosage cup.

13. The system of claim 10, wherein the controller is programmed to execute the dosage application to perform operations including to:
- identify a supplemental chemistry based on the parameters of the detergent; and
- recommend and/or control release of a dose of the supplemental chemistry for the laundry cycle according to parameters of the supplemental chemistry.

14. The system of claim 13, wherein the supplemental chemistry is a fabric softener.

15. The system of claim 13, wherein the controller is programmed to execute the dosage application to perform operations including to:
- visually recommend and/or control release of the dose of the detergent as a fill level of a dosage cup; and
- visually recommend and/or control release of the dose of the supplemental chemistry as a second fill level of the dosage cup.

16. The system of claim 13, wherein the controller is programmed to execute the dosage application to perform operations including to identify the supplemental chemistry based on water properties of water used for the laundry cycle.

17. The system of claim 10, wherein detergent is a first detergent, the parameters are first parameters, and the controller is programmed to execute the dosage application to perform operations including to:
- identify second parameters of a second detergent; and
- recommend use of and/or control release of the first detergent or the second detergent based on the first parameters, the second parameters, and identified conditions of the laundry appliance.

18. The system of claim 17, wherein the identified conditions include one or more of load level of the laundry appliance, water properties of water used for the laundry appliance, or level of soiling of laundry items in the laundry appliance.

19. A non-transitory computer-readable medium comprising instructions that, when executed by one or more processors, cause the one or more processors to perform operations including to:
- receive an image of a detergent container from a camera;
- perform image recognition on the image of the detergent container to identify a detergent to be used based on shape, color and/or brand logo of the detergent container;
- identify parameters of the detergent based on the image recognition;
- identify a dosage cup to be used to dispense the detergent; and
- visually recommend and/or control release of a dose of the detergent for a laundry cycle of a laundry appliance according to the parameters as a fill level of the dosage cup displayed in the shape and color of the dosage cup.

* * * * *